United States Patent
Zheng et al.

(10) Patent No.: US 11,003,731 B2
(45) Date of Patent: May 11, 2021

(54) METHOD AND APPARATUS FOR GENERATING INFORMATION

(71) Applicant: BEIJING BAIDU NETCOM SCIENCE AND TECHNOLOGY CO., LTD., Beijing (CN)

(72) Inventors: Jiepeng Zheng, Beijing (CN); Miao Yu, Beijing (CN); Renkai Yang, Beijing (CN); Yilin Zhang, Beijing (CN); Jialin Wu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 213 days.

(21) Appl. No.: 16/247,023

(22) Filed: Jan. 14, 2019

(65) Prior Publication Data

US 2019/0220495 A1   Jul. 18, 2019

(30) Foreign Application Priority Data

Jan. 17, 2018 (CN) .......................... 201810044255.6

(51) Int. Cl.
  *G06F 16/9538* (2019.01)
  *G06F 16/35* (2019.01)
  *G06F 16/9535* (2019.01)

(52) U.S. Cl.
  CPC .......... *G06F 16/9538* (2019.01); *G06F 16/35* (2019.01); *G06F 16/9535* (2019.01)

(58) Field of Classification Search
  CPC .. G06F 16/9538; G06F 16/9535; G06F 16/35; G06F 16/951
  USPC ....................................................... 707/708
  See application file for complete search history.

(56) References Cited

U.S. PATENT DOCUMENTS 7,146,416 B1 * 12/2006 Yoo ...................... G06F 16/9535
                                                      709/224
7,502,785 B2 *  3/2009 Chen ...................... G06F 16/164
8,005,842 B1 *  8/2011 Pasca .................. G06F 16/3334
                                                      707/741

(Continued)

FOREIGN PATENT DOCUMENTS

KR       20150079032 A      7/2015

OTHER PUBLICATIONS

Wu et al., "Identifying Aspects for Web-Search Queries", Journal of Artificial Intelligence Research, vol. 40, Mar. 2011, pp. 677-700. (Year: 2011).*

*Primary Examiner* — Phuong Thao Cao
(74) *Attorney, Agent, or Firm* — Knobbe, Martens, Olson & Bear, LLP (57) ABSTRACT

Embodiments of a method and apparatus for generating information are provided. An embodiment of the method can include: extracting search data in a preset period; determining target search statements from the search data; determining attributes of the entities in the target search statements; and clustering, for each of the entities involved in the target search statements, the target search statements including the each of the entities according to the attributes in the target search statements including the each of the entities, and determining a target attribute of the each of the entities based on a sum of a number of searches for the target search statements in each of clustered groups. The embodiment can achieve flexible information generation.

11 Claims, 4 Drawing Sheets

(56) References Cited

U.S. PATENT DOCUMENTS

| | | | |
|---|---|---|---|
| 8,145,623 B1* | 3/2012 | Mehta | G06F 16/355 707/713 |
| 8,566,303 B2* | 10/2013 | Jin | G06F 16/35 707/708 |
| 8,583,684 B1* | 11/2013 | Kirmse | G06Q 30/0205 707/770 |
| 8,612,306 B1* | 12/2013 | Mukherjee | G06Q 30/0627 705/26.5 |
| 8,856,099 B1* | 10/2014 | Lasko | G06F 16/951 707/706 |
| 8,909,630 B1* | 12/2014 | Seth | G06F 16/9537 707/724 |
| 8,972,391 B1* | 3/2015 | McDonnell | G06F 16/337 707/727 |
| 9,043,302 B1* | 5/2015 | Shimshoni | G06F 16/951 707/706 |
| 9,047,278 B1* | 6/2015 | Mann | G06F 16/24578 |
| 9,886,517 B2* | 2/2018 | Chen | G06F 16/958 |
| 10,311,371 B1* | 6/2019 | Hotchkies | G06N 5/02 |
| 10,353,964 B2* | 7/2019 | Venugopal | G06F 16/334 |
| 10,497,039 B1* | 12/2019 | Singh | G06F 16/24575 |
| 10,691,702 B1* | 6/2020 | Fujiki | G06F 16/9038 |
| 2003/0144994 A1* | 7/2003 | Wen | G06F 16/9535 |
| 2005/0256833 A1* | 11/2005 | Zeng | G06F 16/951 |
| 2006/0173819 A1* | 8/2006 | Watson | G06F 16/95 |
| 2008/0071740 A1* | 3/2008 | Jhala | G06F 16/3322 |
| 2009/0282010 A1* | 11/2009 | Vasudevan | G06F 16/367 |
| 2010/0082649 A1 | 4/2010 | Gutt et al. | |
| 2010/0198837 A1* | 8/2010 | Wu | G06F 16/9535 707/748 |
| 2011/0153528 A1* | 6/2011 | Bailey | G06Q 30/02 706/12 |
| 2012/0143859 A1* | 6/2012 | Lymperopoulos | G06F 16/9537 707/724 |
| 2012/0143895 A1* | 6/2012 | Salvetti | G06F 16/3329 707/769 |
| 2012/0197732 A1* | 8/2012 | Shen | G06Q 30/02 705/14.66 |
| 2012/0265784 A1* | 10/2012 | Hsu | G06F 16/36 707/771 |
| 2013/0041878 A1* | 2/2013 | Satyanarayana | G06F 16/90324 707/706 |
| 2014/0046934 A1* | 2/2014 | Zhou | G06F 16/24526 707/723 |
| 2014/0067816 A1* | 3/2014 | Kanungo | G06F 16/3344 707/740 |
| 2014/0283097 A1* | 9/2014 | Allen | G06F 21/6254 726/26 |
| 2015/0169771 A1* | 6/2015 | Staddon | G06F 16/9535 707/732 |
| 2015/0269163 A1 | 9/2015 | Sun | |
| 2015/0286685 A1* | 10/2015 | Coll | G06F 16/243 707/755 |
| 2016/0026696 A1* | 1/2016 | Madhavan | G06F 16/248 707/732 |
| 2016/0034559 A1* | 2/2016 | Feyereisl | G06F 16/58 707/738 |
| 2016/0292282 A1* | 10/2016 | Khator | G06F 16/9537 |
| 2017/0098011 A1* | 4/2017 | Islam | G06F 16/9027 |
| 2017/0220606 A1* | 8/2017 | Wang | G06F 16/212 |
| 2017/0235737 A1* | 8/2017 | Livshits | G06F 16/212 707/723 |
| 2018/0060340 A1* | 3/2018 | Hazra | G06F 16/90324 |
| 2018/0373753 A1* | 12/2018 | Flaks | G06F 16/248 |
| 2020/0110778 A1* | 4/2020 | Liu | G06F 16/90328 |

* cited by examiner

METHOD AND APPARATUS FOR GENERATING INFORMATION

CROSS-REFERENCE TO RELATED APPLICATIONS

This application claims priority to Chinese Patent Application no. 201810044255.6, filed in China on Jan. 17, 2018, the contents of which are incorporated herein by reference in their entirety.

TECHNICAL FIELD

Embodiments of the disclosure relate to the field of computer technology, specifically to the field of Internet technology, and more specifically to a method and apparatus for generating information.

BACKGROUND

In the Internet search, a part of QA searches may be described by combining the entities and the attributes. The entity may be information characterizing a concept, a thing, or an event, for example, "Washington," "Seattle," "Gulf War," "Big Bang Theory," and "Mr. Liu." The attribute may reflect characteristics of the entity, or information associated the entity. For example, if an entity is "arthritis," then the example of the attribute may include "treatment," "inquiry," and so on. In order to meet such QA demand, usually it is necessary to exploit each entity and the attribute of the each of the entities.

The existing approach usually exploits entities and attributes of the entities based on encyclopedia or vertical websites. Such solutions need to have authoritative vertical websites, and require comprehensive attributes of the website entity. Another existing approach usually manually defines common attributes of entities based on the vertical types of the entities. However, the existing approaches fail to determine target attributes (such as popular attributes more frequently searched or more concerned by users, or unpopular attributes infrequently searched or unconcerned by users) from the exploited attributes of entities.

SUMMARY

Embodiments of the disclosure present a method and apparatus for generating information.

In a first aspect, an embodiment of the disclosure provides a method for generating information. The method includes: extracting search data in a preset period; determining target search statements from the search data, the target search statements being search statements including an entity in a preset entity list; determining attributes of the entities in the target search statements; and clustering, for each of the entities involved in the target search statements, the target search statements including the each of the entities according to the attributes in the target search statements including the each of the entities, and determining a target attribute of the each of the entities based on a sum of a number of searches for the target search statements in each of clustered groups.

In some embodiments, after the determining a target attribute of the each of the entities based on a sum of a number of searches for the target search statements in each of clustered groups, the method further includes: determining, for the each of the entities involved in the target search statements, an attribute value of the target attribute of the each of the entities, and storing the target attribute of the each of the entities, and the attribute value of the target attribute of the each of the entities into a database.

In some embodiments, the determining target search statements from the search data includes: deduplicating search statements in the search data, and collecting the number of searches for each of the deduplicated search statements in the search data; and determining the target search statements from the deduplicated search statements. The target search statements are the search statements including the entity in the preset entity list.

In some embodiments, before the extracting search data in a preset period, the method further includes: determining standard search statements from preset historical search data, where the standard search statements are search statements including any entity in the entity list and any standard attribute in a preset standard attribute list corresponding to the any entity; and determining, for each of the determined standard search statements, a co-occurrence search statement of the each of the standard search statements from the historical search data, and determining contents other than the entity in the co-occurrence search statement as a generalized attribute of the standard attribute in the each of the standard search statements, where the co-occurrence search statement is a search statement used when a page corresponding to a search result item finally clicked by a user after search is identical to a page corresponding to a search result item finally clicked by the user after searching using the standard search statement.

In some embodiments, the clustering, for each of the entities involved in the target search statements, the target search statements including the each of the entities according to the attributes in the target search statements including the each of the entities includes: matching the attributes of the entities in the target search statements respectively with each of the standard attributes in a corresponding preset standard attribute list and the generalized attribute of the each of the standard attributes; and clustering, for the each of the entities involved in the target search statements, the target search statements including the each of the entities based on an attribute matching result with the each of the standard attributes and the generalized attribute of the each of the standard attributes as a group.

In some embodiments, the determining a target attribute of the each of the entities based on a sum of a number of searches for the target search statements in each of clustered groups includes: determining the sum of the number of searches for the target search statements in each of the clustered groups; and determining the standard attribute corresponding to a maximum value of the determined sum of the number of searches as the target attribute of the entity.

In a second aspect, an embodiment of the disclosure provides an apparatus for generating information. The apparatus includes: an extraction unit configured for extracting search data in a preset period; a first determination unit configured for determining target search statements from the search data, the target search statements being search statements including an entity in a preset entity list; a second determination unit configured for determining attributes of the entities in the target search statements; and a third determination unit configured for clustering, for each of the entities involved in the target search statements, the target search statements including the each of the entities according to the attributes in the target search statements including the each of the entities, and determining a target attribute of the each of the entities based on a sum of a number of searches for the target search statements in each of clustered groups.

In some embodiments, the apparatus further includes: a fourth determination unit configured for determining, for the each of the entities involved in the target search statements, an attribute value of the target attribute of the each of the entities, and storing the target attribute of the each of the entities, and the attribute value of the target attribute of the each of the entities into a database.

In some embodiments, the first determination unit includes: a deduplication module configured for deduplicating search statements in the search data, and collecting the number of searches for each of the deduplicated search statements in the search data; and a determination module configured for determining the target search statements from the deduplicated search statements. The target search statements are the search statements including the entity in the preset entity list.

In some embodiments, the apparatus further includes: a fifth determination unit configured for determining standard search statements from preset historical search data, where the standard search statements are search statements including any entity in the entity list and any standard attribute in a preset standard attribute list corresponding to the any entity; and a sixth determination unit configured for determining, for each of the determined standard search statements, a co-occurrence search statement of the each of the standard search statements from the historical search data, and determining contents other than the entity in the co-occurrence search statement as a generalized attribute of the standard attribute in the each of the standard search statements, where the co-occurrence search statement is a search statement used when a page corresponding to a search result item finally clicked by a user after search is identical to a page corresponding to a search result item finally clicked by the user after searching using the standard search statement.

In some embodiments, the third determination unit includes: a matching module configured for matching the attributes of the entities in the target search statements respectively with each of the standard attributes in a corresponding preset standard attribute list and the generalized attribute of the each of the standard attributes; and a clustering module configured for clustering, for the each of the entities involved in the target search statements, the target search statements including the each of the entities based on an attribute matching result with the each of the standard attributes and the generalized attribute of the each of the standard attributes as a group.

In some embodiments, the third determination unit includes: a first determination module configured for determining the sum of the number of searches for the target search statements in each of the clustered groups; and a second determination module configured for determining the standard attribute corresponding to a maximum value of the determined sum of the number of searches as the target attribute of the entity.

In a third aspect, an embodiment of the disclosure provides a server, including: one or more processors; and a memory for storing one or more programs. The one or more programs enable, when executed by the one or more processors, the one or more processors to implement the method according to any one embodiment of the method for generating information.

In a fourth aspect, an embodiment of the disclosure provides a computer readable storage medium storing a computer program therein. The program implements, when executed by a processor, the method according to any one embodiment of the method for generating information.

The method and apparatus for generating information according to the embodiments of the disclosure determine target search statements from search data extracted in a preset period, then determine attributes of the entities in the target search statements, then cluster, for each of the entities involved in the target search statements, the target search statements including the each of the entities according to the attributes in the target search statements including the each of the entities, and determine a target attribute of the each of the entities based on a sum of a number of searches for the target search statements in each of clustered groups, thereby determining target attributes (such as popular attributes more frequently searched or more concerned by users, or unpopular attributes infrequently searched or unconcerned by users) from the exploited attributes of entities, and achieving flexible information generation.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, other than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
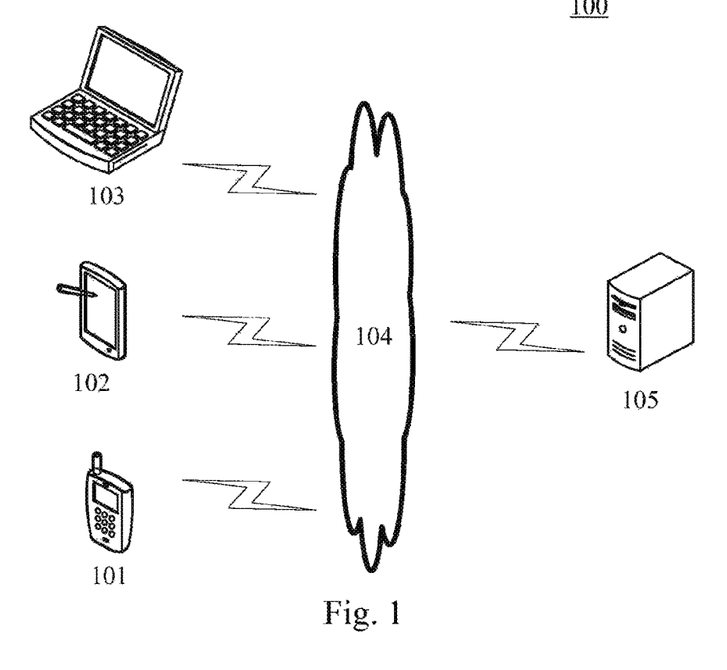
FIG. 1 is a structural diagram of an illustrative system in which some embodiments of the disclosure may be applied.

FIG. 1 shows an illustrative architecture of a system 100 which may be used by a method for generating information or an apparatus for generating information according to the embodiments of the present application.

As shown in FIG. 1, the system architecture 100 may include terminal devices 101, 102, and 103, a network 104 and a server 105. The network 104 serves as a medium providing a communication link between the terminal devices 101, 102, and 103, and the server 105. The network 104 may include various types of connections, such as wired or wireless transmission links, or optical fibers.

The user may use the terminal device 101, 102, or 103 to interact with the server 105 through the network 104, in order to transmit or receive messages, etc. Various communication client applications, such as search applications and webpage browser applications may be installed on the terminal devices 101, 102, and 103.

The terminal devices 101, 102, and 103 may be various electronic devices having a display and capable of browsing a webpage, including but not limited to, smart phones, tablet computers, laptop computers, and desktop computers.

The server 105 may be a server providing various services, for example, a data processing server processing the search data produced by searching information from the terminal device 101, 102 or 103. The data processing server may perform corresponding processing on the search data and action data produced on the basis of receiving the search request according to the received data copy or deletion request, and store a processing result (for example, a target attribute).

It should be noted that the method for generating information according to the embodiments of the present application is generally executed by the server 105. Accordingly, the apparatus for generating information is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
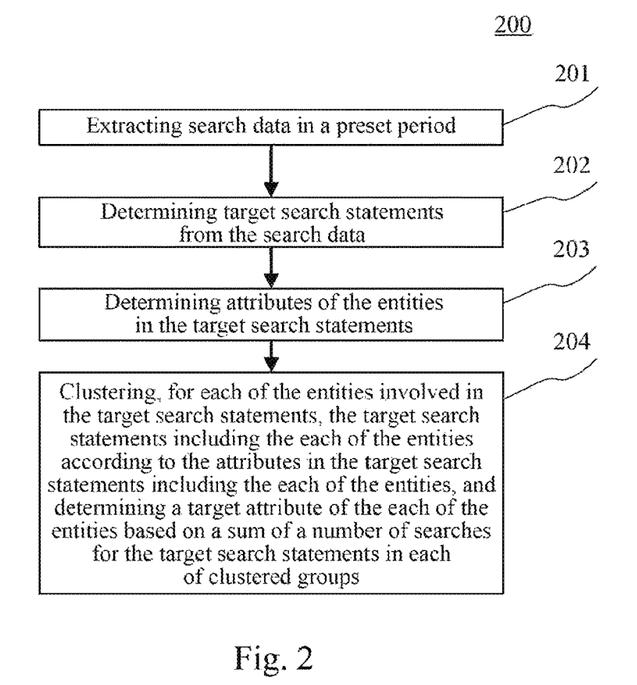
FIG. 2 is a process diagram of an embodiment of a method for generating information according to the disclosure.

Further referring to FIG. 2, a process 200 of an embodiment of a method for generating information according to the disclosure is shown. The method for generating information includes:

Step 201: extracting search data in a preset period.

In the embodiment, an electronic device (e.g., the server 105 shown in FIG. 1) on which the method for generating information runs may store historical search data. The historical search data may be data generated after information search by a user prior to a current moment, for example, a search log. The electronic device may extract search data from the historical search data in a preset period (e.g., in the last week). In practice, the search data may include, but is not limited to, following information: a search statement included in a search request sent by the user, each search result item (e.g., a web page link) clicked by the user after sending the search request, click time, or user name.

It should be noted that, in some application scenarios, the historical search data may also be stored in other device (e.g., a data storage server) in communication link with the electronic device. In these application scenarios, the electronic device may extract the search data from the device in the preset period by wired connection or wireless connection. It should be noted that the wireless connection type may include, but is not limited to, 3G/4G connection, WiFi connection, Bluetooth connection, WiMAX connection, Zigbee connection, UWB (ultra wideband) connection, and other wireless connections that are known at present or are to be developed in the future.

Step 202: determining target search statements from the search data.

In the embodiment, the electronic device may pre-store an entity list. The entity list may be pre-established by skilled persons, or obtained by pre-exploiting and summarizing entities using various data mining methods, which are not limited here. In practice, the entity may be information characterizing a concept, a thing, or an event. For example, "Washington," "Seattle," "Gulf War," "Big Bang Theory," and "Mr. Liu" may be used as examples of entities. Here, "Mr. Liu" may be a specific name, such as a name of a star. It should be noted that, an entity may have an attribute, and the attribute may reflect characteristics of the entity in any aspect or the information associated with the entity. For example, if an entity is "arthritis," then the example of the attribute may include "treatment," or "inquiry."

Here, the electronic device may match each search statement in the search data with an entity in the entity list using a string matching method (e.g., using an Aho-Corasick automaton algorithm for string matching), and determine search statements including the entities in the preset entity list as target search statements, to determine target search statements from the search data. For example, a search statement "who is the wife of Mr. Liu" includes the entity "Mr. Liu," and then the search statement "who is the wife of Mr. Liu" may be determined as the target search statement.

Step 203: determining attributes of the entities in the target search statements.

In the embodiment, the electronic device may pre-store an attribute list of each entity in the entity list. For example, an attribute list of the entity "Mr. Liu" may include an attribute "wife," an attribute "daughter," an attribute "film and television program," or an attribute "song." The attribute list of each entity may be pre-established by skilled persons, or obtained by pre-exploiting and summarizing attributes from the encyclopedia websites or vertical websites using various data mining methods, which are not limited here.

The electronic device may determine attributes of entities in each of the target search statements as follows: first, for the each of the target search statements, the electronic device may first segment the each of the target search statements at the end of entities. As an example, for the target search statement "who is the wife of Mr. Liu," the electronic device may segment the target search statement into entities "Mr. Liu" and "who is the wife of." The "who is the wife of" is the attribute of the entity "Mr. Liu." Then, the electronic device may match the segmented portion excluding the entity with attributes in the attribute list of the entity using the string matching method. Then, the electronic device may use the matched attributes in the attribute list as the attributes of the entity in the target search statement, or determine the segmented portion excluding the entity as the attributes of the entity in the target search statement in response to the matched attributes in the attribute list.

In some optional implementations of the embodiment, the electronic device may directly determine s in the each of the target search statements as the attributes of the entity in the each of the target search statements.

Step 204: clustering, for each of the entities involved in the target search statements, the target search statements including the each of the entities according to the attributes in the target search statements including the each of the entities, and determining a target attribute of the each of the entities based on a sum of a number of searches for the target search statements in each of clustered groups.

In the embodiment, for each of the entities involved in the target search statements, the electronic device may execute:

first step: clustering the target search statement including the each of the entities according to the attribute of the target search statement including the each of the entities. It should be noted that, each of the groups may correspond to a kind of attribute of the each of the entities, and a given kind of attribute may include a given attribute in the attribute list of the each of the entities. As an example, the entity is "Mr. Liu," and the target search statements including the entity include "who is the wife of Mr. Liu," "the wife of Mr. Liu," "what is the name of the wife of Mr. Liu," "the daughter of Mr. Liu," "what is the name of the daughter of Mr. Liu," "who is the daughter of Mr. Liu," "The movies of Mr. Liu," and "what are the movies of Mr. Liu" respectively. The target search statements "who is the wife of Mr. Liu," "the wife of Mr. Liu," and "what is the name of the wife of Mr. Liu" each include the attribute "wife" in the attribute list of the entity "Mr. Liu." Therefore, it may be regarded as that the three target search statements include a given kind of attribute of the entity "Mr. Liu," and may be used as a group. Furthermore, the target search statements "the daughter of Mr. Liu," "what is the name of the daughter of Mr. Liu," and "who is the daughter of Mr. Liu" include the attribute "daughter" in the attribute list of the entity "Mr. Liu." Therefore, it may be regarded as that the three target search statements include the given kind of attribute of the entity "Mr. Liu," and may be used as a group. Furthermore, the target search statements "the movies of Mr. Liu," and "what are the movies of Mr. Liu" include the attribute "movie" in the attribute list of the entity "Mr. Liu." Therefore, it may be regarded as that the two target search statements include the given kind of attribute of the entity "Mr. Liu," and may be used as a group.

second step: determining a target attribute of the each of the entities, based on the sum of the number of searches for the target search statements in each of the clustered groups. Here, the target attribute may be a popular or unpopular attribute. The popular attribute may refer to an attribute more frequently searched and more concerned by users when searching problems associated with an entity in a search engine. The unpopular attribute may refer to an attribute infrequently searched and relatively unconcerned by users when searching problems associated with an entity in a search engine. The electronic device may determine the popularity of the attribute of the each of the entities based on the sum of the number of searches.

In some optional implementations of the embodiment, the target attribute may be a popular attribute. In this case, the electronic device may first determine the sum of the number of searches for the target search statements in each of the clustered groups, and then determine the attribute corresponding to a maximum value of the sum of the number of searches as the popular attribute of the entity. It should be noted that, the number of popular attributes is not limited to one, and may be any preset number (e.g., three). In this case, the electronic device may first sort attributes corresponding to various groups in descending order of the number of searches, and then select a preset number (e.g., three) of attributes based on the sorted order as the popular attributes of the entity.

In some optional implementations of the embodiment, the target attribute may be an unpopular attribute. In this case, the electronic device may first determine the sum of the number of searches for the target search statements in each of the clustered groups, and then determine the attribute corresponding to a minimum value of the sum of the number of searches as the unpopular attribute of the entity. It should be noted that, the number of unpopular attributes is not limited to one, and may be any preset number (e.g., three). In this case, the electronic device may first sort attributes corresponding to various groups in ascending order of the number of searches, and then select a preset number (e.g., three) of attributes based on the sorted order as the unpopular attributes of the entity.

Figure 3:
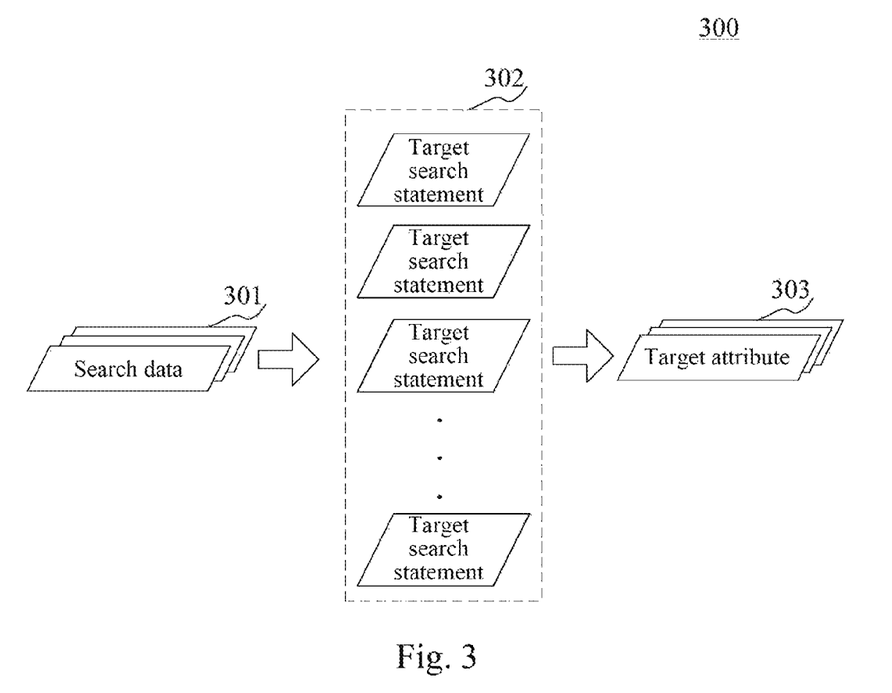
FIG. 3 is a schematic diagram of an application scenario of a method for generating information according to some embodiments of the disclosure.

Further referring to FIG. 3, FIG. 3 is a schematic diagram of an application scenario of a method for generating information according to the embodiment. In the application scenario of FIG. 3, the data processing server may first extract search data 301 in a week; then, the data processing server determines target search statements 302 from the search data 301 to determine attributes of the entities in the target search statements; and then, for each of the entities involved in the target search statements, the data processing server may cluster the target search statements including the each of the entities according to the attributes in the target search statements including the each of the entities, and determine a target attribute 303 of the each of the entities based on a sum of a number of searches for the target search statements in each of clustered groups.

The method according to the above embodiments of the disclosure determines target search statements from search data extracted in a preset period, then determines attributes of the entities in the target search statements, then clusters, for each of the entities involved in the target search statements, the target search statements including the each of the entities according to the attributes in the target search statements including the each of the entities, and determines a target attribute of the each of the entities based on a sum of a number of searches for the target search statements in each of clustered groups, thereby determining target attributes (such as popular attributes more frequently searched or more concerned by users, or unpopular attributes infrequently searched or relatively unconcerned by users) from the exploited attributes of entities, and achieving flexible information generation.

Figure 4:
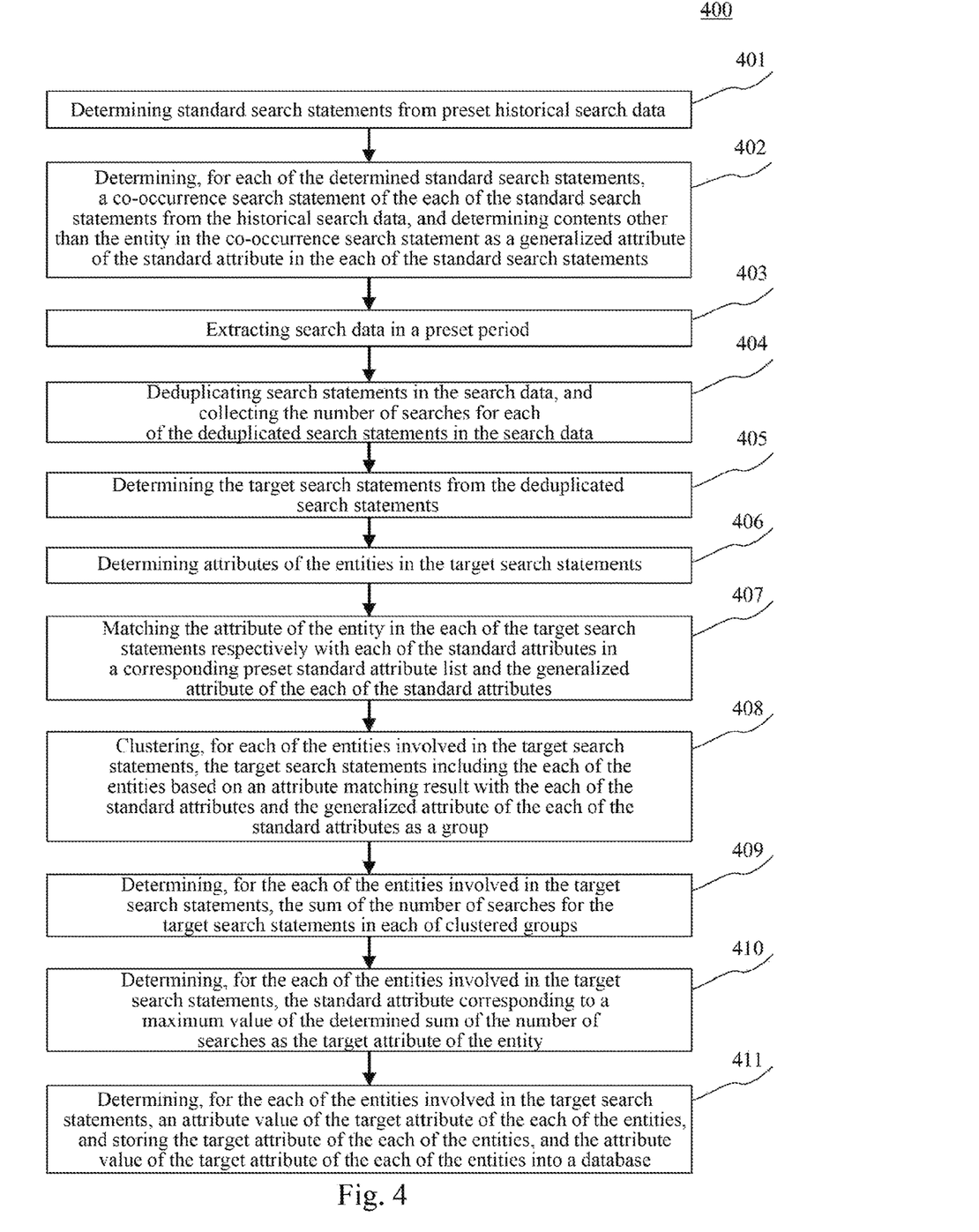
FIG. 4 is a process diagram of another embodiment of a method for generating information according to the disclosure.

Further referring to FIG. 4, a process 400 of another embodiment of a method for generating information is shown. The process 400 of the method for generating information includes:

Step 401: determining standard search statements from preset historical search data.

In the embodiment, the electronic device (e.g., the server 105 shown in FIG. 1) on which the method for generating information runs may store historical search data. The historical search data may be data generated after information search by a user prior to a current moment, for example, a search log. In practice, the historical search data may include, but are not limited to, following information: a search statement included in a search request sent by the user, each search result item clicked by the user after sending the search request, click time, or user name. Furthermore, the electronic device may further pre-store an entity list, and store a preset standard attribute list corresponding to each entity in the entity list. The entity list and the preset standard attribute list may be pre-established by skilled persons, or obtained by the electronic device through pre-exploiting and summarizing attributes of entities using various data mining methods, which are not limited here. The standard attribute may reflect characteristics of the entity in any aspect or information associated with the entity, such as "wife," "daughter," or "movie work."

Furthermore, the electronic device may determine a search statement including any entity in the entity list and any standard attribute in a preset standard attribute list corresponding to the any entity as the standard search statement, and determine the standard search statement from the historical search data. For example, a standard search statement "the wife of Mr. Liu" is formed by the entity "Mr. Liu" and the standard attribute "wife" of the entity.

Step 402: determining, for each of the determined standard search statements, a co-occurrence search statement of the each of the standard search statements from the historical search data, and determining contents other than the entity in the co-occurrence search statement as a generalized attribute of the standard attribute in the each of the standard search statements.

In the embodiment, the electronic device may determine, for each of the determined standard search statements, a co-occurrence search statement of the each of the standard search statements from the historical search data. The co-occurrence search statement may be a search statement used when a page corresponding to a search result item finally clicked by a user after search is identical to a page corresponding to a search result item finally clicked by the user after searching using the standard search statement. Here, the historical search data includes information, such as each search result item and click time, clicked by the user after sending a search request. Therefore, for each search statement in the historical search data, the electronic device may determine a finally clicked search result item after searching by the user using the search statement based on time of clicking the each search result item by the user. As an example, if a user clicks successively a first search result item, a second search result item, and a third search result item after search using a search statement, and then the user does not execute an operation of clicking any search result item corresponding to the search statement any more, then the third search result item is the finally clicked search result item after search using the search statement. It should be noted that pages corresponding to the search result items being identical may be identical contents or links of the pages corresponding to the search result items.

After determining the co-occurrence search statement of the each of the standard search statements, the electronic device may determine contents other than the entity in the co-occurrence search statement as a generalized attribute of the standard attribute in the each of the standard search statements. As an example, the co-occurrence search statement of the standard search statement "the daughter of Mr. Liu" includes "who is the daughter of Mr. Liu," "who is the girl of Mr. Liu," "the daughter of Mr. Liu," "the girl of Mr. Liu", "what is the name of the daughter of Mr. Liu," and "what is the name of the girl of Mr. Liu." The contents "who is the daughter of," "who is the girl of," "the daughter of," "the girl of," "what is the name of the daughter of," and "what is the name of the girl of" other than the entities in the co-occurrence search statement are the generalized attribute of the standard attribute "daughter."

Step 403: extracting search data in a preset period.

In the embodiment, the electronic device may extract search data from the historical search data in a preset period (e.g., in the last week).

Step 404: deduplicating search statements in the search data, and collecting the number of searches for each of the deduplicated search statements in the search data.

In the embodiment, the electronic device may deduplicate search statements in the extracted search data, and collect the number of searches for each of the deduplicated search statements in the search data. In practice, the electronic device may deduplicate the search statements using existing data deduplication methods or existing data deduplication tools, which are not repeated any more here.

Step 405: determining the target search statements from the deduplicated search statements.

In the embodiment, the electronic device may match each search statement in the deduplicated search statements with an entity in the entity list using a string matching method (e.g., using an Aho-Corasick automaton algorithm for string matching), and determine search statements including entities in the preset entity list as target search statements, to determine the target search statements from the deduplicated search statements.

Step 406: determining attributes of the entities in the target search statements.

In the embodiment, for each of the target search statements, the electronic device may directly determine contents other than the entity in the each of the target search statements as the attributes of the entity in the each of the target search statements.

Step 407: matching the attribute of the entity in the each of the target search statements respectively with each of the standard attributes in a corresponding preset standard attribute list and the generalized attribute of the each of the standard attributes.

In the embodiment, the electronic device may match the attributes of the entities in the target search statements respectively with each of the standard attributes in a corresponding preset standard attribute list and the generalized attribute of the each of the standard attributes. Specifically, for the each of the target search statements, the electronic device may match the attribute of the entity in the each of the target search statements respectively with each of the standard attributes in a preset standard attribute list of the entity and the generalized attribute of the each of the standard attributes.

Step 408: clustering, for each of the entities involved in the target search statements, the target search statements including the each of the entities based on an attribute matching result with the each of the standard attributes and the generalized attribute of the each of the standard attributes as a group.

In the embodiment, for each of the entities involved in the target search statements, the electronic device may cluster the target search statements including the each of the entities based on an attribute matching result with the each of the standard attributes and the generalized attribute of the each of the standard attributes as a group.

As an example, the target search statements involving the entity "Mr. Liu" included in the target search statements include "the wife of Mr. Liu," "who is the wife of Mr. Liu," "the daughter of Mr. Liu," "who is the daughter of Mr. Liu," "who is the girl of Mr. Liu," "the movie work of Mr. Liu," and "what are the movies of Mr. Liu." The generalized attribute of the standard attribute "wife" includes "who is the wife of," the generalized attribute of the standard attribute "daughter" includes "who is the daughter of," and "who is the girl of;" and the generalized attribute of the standard attribute "movie" includes "the movie work of" and "what are the movies of." For the entity "Mr. Liu," the electronic device may cluster the target search statements with the involved standard attributes and the generalized attributes of the standard attributes as a group (i.e., with "the wife of" and "who is the wife of" as a group, with "the daughter of," "who is the daughter of," and "who is the girl of" as a group, and with "movie work" and "what are the movies of" as a group), and divide the target search statements involving the entity "Mr. Liu" into three groups, with the target search statements "the wife of Mr. Liu," and "who is the wife of Mr. Liu" as a group, with the target search statements "the daughter of Mr. Liu," "who is the daughter of Mr. Liu," and "who is the girl of Mr. Liu" as a group, and with the target search statements "the movie work of Mr. Liu" and "what are the movies of Mr. Liu" as a group.

Step 409: determining, for the each of the entities involved in the target search statements, the sum of the number of searches for the target search statements in each of clustered groups.

In the embodiment, for the each of the entities involved in the target search statements, the electronic device may determine the sum of the number of searches for the target search statements in each of clustered groups.

Step 410: determining, for the each of the entities involved in the target search statements, the standard attribute corresponding to a maximum value of the determined sum of the number of searches as the target attribute of the entity.

In the embodiment, for the each of the entities involved in the target search statements, the electronic device may determine the standard attribute corresponding to a maximum value of the determined sum of the number of searches as the target attribute of the entity. Here, the target attribute may be a popular attribute, i.e., an attribute most frequently searched and most concerned by users when the users search problems associated with the entity.

Step 411: determining, for the each of the entities involved in the target search statements, an attribute value of the target attribute of the each of the entities, and storing the target attribute of the each of the entities, and the attribute value of the target attribute of the each of the entities into a database.

In the embodiment, for the each of the entities involved in the target search statements, the electronic device may determine an attribute value of the target attribute of the each of the entities, and store the target attribute of the each of the entities, and the attribute value of the target attribute of the each of the entities into a database. As an example, the electronic device may retrieve the attribute value of the target attribute of the each of the entities from a preset knowledge graph to obtain the attribute value.

As can be seen from FIG. 4, compared with the embodiment corresponding to FIG. 2, a process 400 of a method according to the embodiment highlights generalizing attributes based on historical search data, and clustering the target search statements based on the standard attribute and the generalized attribute. Therefore, the solution according to the embodiment may consider the diversification and colloquial problems of the search statements, to more comprehensively collect and process the search data, thereby improving the accuracy of the generated target attributes.

Figure 5:
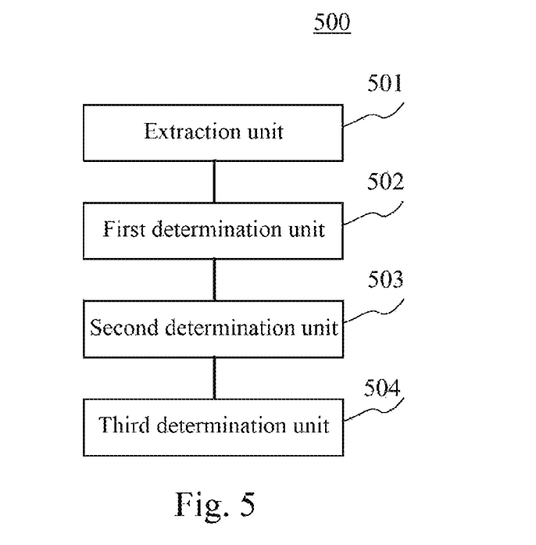
FIG. 5 is a schematic diagram of a structure of an embodiment of an apparatus for generating information according to the disclosure.

Further referring to FIG. 5, as an implementation of the method shown in the above figures, the disclosure provides an embodiment of an apparatus for generating information. The embodiment of the apparatus corresponds to the embodiment of the method shown in FIG. 2. The apparatus may be specifically applied to a variety of electronic devices.

As shown in FIG. 5, an apparatus 500 for generating information according to the embodiment includes: an extraction unit 501 configured for extracting search data in a preset period; a first determination unit 502 configured for determining target search statements from the search data, the target search statements being search statements including an entity in a preset entity list; a second determination unit 503 configured for determining attributes of the entities in the target search statements; and a third determination unit 504 configured for clustering, for each of the entities involved in the target search statements, the target search statements including the each of the entities according to the attributes in the target search statements including the each of the entities, and determining a target attribute of the each of the entities based on a sum of a number of searches for the target search statements in each of clustered groups.

In some optional implementations of the embodiment, the apparatus 500 for generating information may further include a fourth determination unit (not shown in the figure). The fourth determination unit may be configured for determining, for the each of the entities involved in the target search statements, an attribute value of the target attribute of the each of the entities, and storing the target attribute of the each of the entities, and the attribute value of the target attribute of the each of the entities into a database.

In some optional implementations of the embodiment, the first determination unit 502 may include a deduplication module and a determination module (not shown in the figure). The deduplication module may be configured for deduplicating search statements in the search data, and collecting the number of searches for each of the deduplicated search statements in the search data. The determination module may be configured for determining the target search statements from the deduplicated search statements. The target search statements are the search statements including the entity in the preset entity list.

In some optional implementations of the embodiment, the apparatus 500 for generating information may further include a fifth determination unit and a sixth determination unit (not shown in the figure). The fifth determination unit may be configured for determining standard search statements from preset historical search data. The standard search statements are search statements including any entity in the entity list and any standard attribute in a preset standard attribute list corresponding to the any entity. The sixth determination unit may be configured for determining, for each of the determined standard search statements, a co-occurrence search statement of the each of the standard search statements from the historical search data, and determining contents other than the entity in the co-occurrence search statement as a generalized attribute of the standard attribute in the each of the standard search statements, wherein the co-occurrence search statement is a search statement used when a page corresponding to a search result item finally clicked by a user after search is identical to a page corresponding to a search result item finally clicked by the user after searching using the standard search statement.

In some optional implementations of the embodiment, the third determination unit 504 may include a matching module and a clustering module (not shown in the figure). The matching module may be configured for matching the attributes of the entities in the target search statements respectively with each of the standard attributes in a corresponding preset standard attribute list and the generalized attribute of the each of the standard attributes. The clustering module may be configured for clustering, for the each of the entities involved in the target search statements, the target search statements including the each of the entities based on an attribute matching result with the each of the standard attributes and the generalized attribute of the each of the standard attributes as a group.

In some optional implementations of the embodiment, the third determination unit 504 may include a first determination module and a second determination module (not shown in the figure). The first determination module may be configured for determining the sum of the number of searches for the target search statements in each of the clustered groups. The second determination module may be configured for determining the standard attribute corresponding to a maximum value of the determined sum of the number of searches as the target attribute of the entity.

The apparatus according to the above embodiments of the disclosure determines target search statements by the first determination unit 502 from search data extracted by the extraction unit 501 in a preset period, then determines attributes of the entities in the target search statements by the second determination unit 503, then clusters, for each of the entities involved in the target search statements, the target search statements including the each of the entities by the third determination unit 504 according to the attributes in the target search statements including the each of the entities, and determines a target attribute of the each of the entities based on a sum of a number of searches for the target search statements in each of clustered groups, thereby determining target attributes (such as popular attributes more frequently searched or more concerned by users, or unpopular attributes infrequently searched or unconcerned by users) from the exploited attributes of entities, and achieving flexible information generation.

Figure 6:
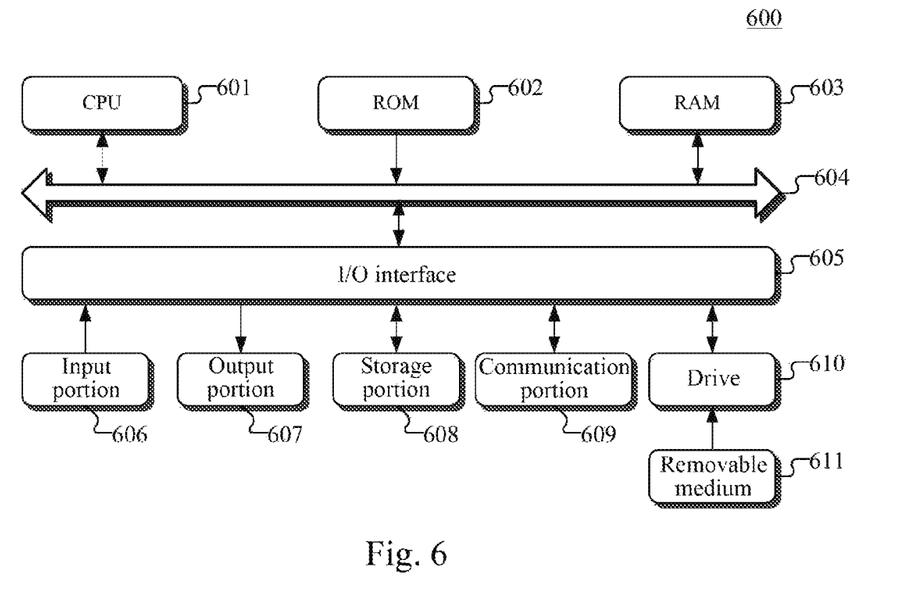
FIG. 6 is a schematic diagram of a structure of a computer system suitable for implementing a server according to an embodiment of the disclosure.

Referring to FIG. 6, a schematic structural diagram of a computer system 600 adapted to implement a server of the embodiments of the present application is shown. The server shown in FIG. 6 is merely an example and should not impose any restriction on the function and scope of use of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of some embodiments of the present disclosure. It should be noted that the computer readable medium in some embodiments of the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an extraction unit, a first determination unit, a second determination unit, and a third determination unit, where the names of these units or modules do not in some cases constitute a limitation to such units or modules themselves. For example, the extraction unit may also be described as "a unit for extracting search data in a preset period."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: extract search data in a preset period; determine target search statements from the search data; determine attributes of the entities in the target search statements; cluster, for each of the entities involved in the target search statements, the target search statements including the each of the entities according to the attributes in the target search statements including the each of the entities, and determine a target attribute of the each of the entities based on a sum of a number of searches for the target search statements in each of clustered groups.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for generating information, the method comprising:
   determining standard search statements from preset historical search data, wherein the standard search statements are search statements including any entity in a preset entity list and any standard attribute in a preset standard attribute list corresponding to the any entity;
   determining, for each of the determined standard search statements, a co-occurrence search statement of the each of the standard search statements from the historical search data, and determining contents other than an entity in the co-occurrence search statement as a generalized attribute of the standard attribute in the each of the standard search statements, wherein the co-occurrence search statement is a search statement used when a page corresponding to a search result item finally clicked by a user after search is identical to a page corresponding to a search result item finally clicked by the user after searching using the standard search statement;
   extracting search data in a preset period;
   determining target search statements from the search data, the target search statements being search statements including entities in the preset entity list;
   determining attributes of the entities included in the target search statements, each attribute associated with a standard attribute and at least one corresponding generalized attribute; and
   clustering, for each of the entities involved in the target search statements, the target search statements including the each of the entities according to the attributes in the target search statements including the each of the entities, and determining a target attribute of the each of the entities based on a sum of a number of searches for the target search statements in each of clustered groups.

2. The method for generating information according to claim 1, wherein after the determining a target attribute of the each of the entities based on a sum of a number of searches for the target search statements in each of clustered groups, the method further comprises:
   determining, for the each of the entities involved in the target search statements, an attribute value of the target attribute of the each of the entities, and storing the target attribute of the each of the entities, and the attribute value of the target attribute of the each of the entities into a database.

3. The method for generating information according to claim 1, wherein the determining target search statements from the search data comprises:
   deduplicating search statements in the search data, and collecting the number of searches for each of the deduplicated search statements in the search data; and
   determining the target search statements from the deduplicated search statements, wherein the target search statements are the search statements including the entity in the preset entity list.

4. The method for generating information according to claim 1, wherein the clustering, for each of the entities involved in the target search statements, the target search statements including the each of the entities according to the attributes in the target search statements including the each of the entities comprises:
   matching the attributes of the entities in the target search statements respectively with each of the standard attributes in the preset standard attribute list and the generalized attribute of the each of the standard attributes; and
   clustering, for the each of the entities involved in the target search statements, the target search statements including the each of the entities based on an attribute matching result with the each of the standard attributes and the generalized attribute of the each of the standard attributes as a group.

5. The method for generating information according to claim 4, wherein the determining a target attribute of the each of the entities based on a sum of a number of searches for the target search statements in each of clustered groups comprises:
   determining the sum of the number of searches for the target search statements in each of the clustered groups; and
   determining the standard attribute corresponding to a maximum value of the determined sum of the number of searches as the target attribute of the entity.

6. An apparatus for generating information, comprising:
   at least one processor; and
   a memory storing instructions, the instructions when executed by the at least one processor, cause the at least one processor to perform operations, the operations comprising:
   determining standard search statements from preset historical search data, wherein the standard search statements are search statements including any entity in a preset entity list and any standard attribute in a preset standard attribute list corresponding to the any entity;
   determining, for each of the determined standard search statements, a co-occurrence search statement of the each of the standard search statements from the historical search data, and determining contents other than an entity in the co-occurrence search statement as a generalized attribute of the standard attribute in the each of the standard search statements, wherein the co-occurrence search statement is a search statement used when a page corresponding to a search result item finally clicked by a user after search is identical to a page corresponding to a search result item finally clicked by the user after searching using the standard search statement;
   extracting search data in a preset period;

determining target search statements from the search data, the target search statements being search statements including entities in the preset entity list;

determining attributes of the entities included in the target search statements, each attribute associated with a standard attribute and at least one corresponding generalized attribute; and clustering, for each of the entities involved in the target search statements, the target search statements including the each of the entities according to the attributes in the target search statements including the each of the entities, and determining a target attribute of the each of the entities based on a sum of a number of searches for the target search statements in each of clustered groups.

7. The apparatus for generating information according to claim 6, wherein after the determining a target attribute of the each of the entities based on a sum of a number of searches for the target search statements in each of clustered groups, the operations further comprise:

determining, for the each of the entities involved in the target search statements, an attribute value of the target attribute of the each of the entities, and storing the target attribute of the each of the entities, and the attribute value of the target attribute of the each of the entities into a database.

8. The apparatus for generating information according to claim 6, wherein the determining target search statements from the search data comprises:

deduplicating search statements in the search data, and collecting the number of searches for each of the deduplicated search statements in the search data; and determining the target search statements from the deduplicated search statements, wherein the target search statements are the search statements including the entity in the preset entity list.

9. The apparatus for generating information according to claim 6, wherein the clustering, for each of the entities involved in the target search statements, the target search statements including the each of the entities according to the attributes in the target search statements including the each of the entities comprises:

matching the attributes of the entities in the target search statements respectively with each of the standard attributes in the preset standard attribute list and the generalized attribute of the each of the standard attributes; and clustering, for the each of the entities involved in the target search statements, the target search statements including the each of the entities based on an attribute matching result with the each of the standard attributes and the generalized attribute of the each of the standard attributes as a group.

10. The apparatus for generating information according to claim 9, wherein the determining a target attribute of the each of the entities based on a sum of a number of searches for the target search statements in each of clustered groups comprises:

determining the sum of the number of searches for the target search statements in each of the clustered groups; and determining the standard attribute corresponding to a maximum value of the determined sum of the number of searches as the target attribute of the entity.

11. A non-transitory computer-readable storage medium storing a computer program, the computer program when executed by one or more processors, causes the one or more processors to perform operations, the operations comprising:

determining standard search statements from preset historical search data, wherein the standard search statements are search statements including any entity in a preset entity list and any standard attribute in a preset standard attribute list corresponding to the any entity;

determining, for each of the determined standard search statements, a co-occurrence search statement of the each of the standard search statements from the historical search data, and determining contents other than an entity in the co-occurrence search statement as a generalized attribute of the standard attribute in the each of the standard search statements, wherein the co-occurrence search statement is a search statement used when a page corresponding to a search result item finally clicked by a user after search is identical to a page corresponding to a search result item finally clicked by the user after searching using the standard search statement;

extracting search data in a preset period;

determining target search statements from the search data, the target search statements being search statements including entities in the preset entity list;

determining attributes of the entities included in the target search statements, each attribute associated with a standard attribute and at least one corresponding generalized attribute; and clustering, for each of the entities involved in the target search statements, the target search statements including the each of the entities according to the attributes in the target search statements including the each of the entities, and determining a target attribute of the each of the entities based on a sum of a number of searches for the target search statements in each of clustered groups.

* * * * *